Sept. 16, 1958 S. H. DUFFIELD 2,852,648

PHOTOCONDUCTIVE CELLS AND PROCESS FOR MANUFACTURING SAME

Filed March 19, 1957 3 Sheets-Sheet 1

Stanley H. Duffield
INVENTOR.

BY Daniel I. Mayne
FM Emerson Holmes

ATTORNEYS

Sept. 16, 1958 S. H. DUFFIELD 2,852,648

PHOTOCONDUCTIVE CELLS AND PROCESS FOR MANUFACTURING SAME

Filed March 19, 1957 3 Sheets-Sheet 2

Stanley H. Duffield
INVENTOR.

BY Daniel I. Mayne
F. M. Emerson Holmes
ATTORNEYS

Sept. 16, 1958 S. H. DUFFIELD 2,852,648

PHOTOCONDUCTIVE CELLS AND PROCESS FOR MANUFACTURING SAME

Filed March 19, 1957 3 Sheets-Sheet 3

Stanley H. Duffield
INVENTOR.

BY Daniel I. Mayne
[illegible]
ATTORNEYS

United States Patent Office 2,852,648 Patented Sept. 16, 1958

2,852,648

PHOTOCONDUCTIVE CELLS AND PROCESS FOR MANUFACTURING SAME

Stanley H. Duffield, Rochester, N. Y., assignor to Eastman Kodak Company, Rochester, N. Y., a corporation of New Jersey Application March 19, 1957, Serial No. 647,164

7 Claims. (Cl. 201—63)

This invention relates to a method of manufacturing a small photoconductive cell or an array of such cells.

The primary object of the invention is to provide a method of making a small cell of predetermined dimensions and sensitivity. It is also an object of the invention to provide such a cell which is rugged and simple to manufacture with high precision. According to the invention, the cell or array of cells is prepared on a flat glass surface by making a narrow groove in the surface, then masking the groove transversely by a strip of metal or by a strip of paint which is strippable or soluble. The masked plate is then placed in a suitable vacuum chamber and metal electrodes, preferably of gold, or any of the other metals used for electrodes in such cells are evaporated onto the surface. The mask is then removed and a photoconductive layer is deposited either by chemical precipitation or by vacuum evaporation onto the glass (and groove) surface which had been shielded by the mask and also onto the edges of both electrodes in the groove. This means that the photoconductive material is also applied to the metal on the top of the glass surface and may extend over all of the glass, back as well as front.

In one embodiment of the invention the photoconductive material is prevented from depositing on the outer ends of the electrodes and other parts of the glass block by a suitable resist painted onto these areas before the photoconductive layer is deposited.

In another embodiment, which is the preferable one, the photoconductive layer is coated in the desired area and also in some undesired areas. It is then overcoated with a resist forming a stripe somewhat wider than the original mask. The photoconductive material is then dissolved away from the parts not protected by this resist, leaving the photoconductive material on the inner edges of the electrodes and on the area between the electrodes.

The metal and the photoconductive material and any other resist or coating which happens to be on the glass surface is removed from the surface except for the parts down in the groove, by lapping the surface against another flat surface, preferably with a fine lapping compound.

The lapping or grinding operation may take place immediately after the photoconductive layer is applied or after the resist is applied over this layer or after the photoconductive layer has been dissolved away except in the areas covered by the resist. When the resist is used, it is preferably a material which is transparent to the radiations to be measured by the cell so that it may remain in place to act as a protective coating for the photoconductive layer. The resist may be applied simply by painting it on or by evaporating it through a suitable mask in a vacuum chamber. Procedures for evaporation of various materials or for applying them with a suitable brush or applicator or for applying them by chemical methods are well known and the present invention is not concerned with which of the known methods is used for each of these operations.

It is customary with tiny cells of this type to attach lead wires by soldering onto the electrodes. However, simple clamps applying pressure contact onto the electrodes can be used. The method of attaching leads to the electrodes is not part of the present invention.

To make a row of tiny cells or an array of such cells, a sheet of glass with a plurality of parallel grooves is used and the masks are applied in strips running across all of the grooves. The shape of the groove, i. e. its cross section, is not critical. The grooves may be prepared by mechanical processes or photochemical processes and glass blocks with such grooves are available from various manufacturers.

The invention and various advantages thereof will be more fully understood from the following description when read in connection with the accompanying drawings in which.

Figures 1, 2, 3:
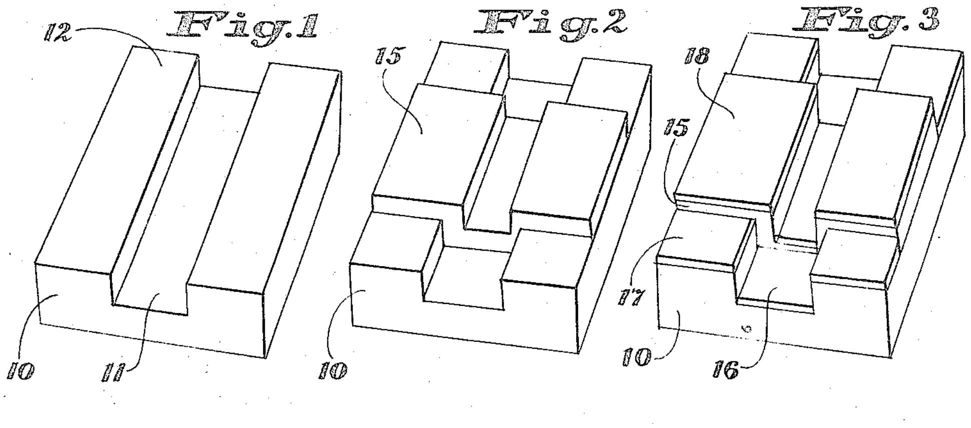
Figs. 1–9 are greatly enlarged perspective views of a single cell at various stages of its manufacture according to a preferred embodiment of the invention.

In Fig. 1 a glass block 10 has a flat surface 12 and a groove 11 of rectangular cross sections running lengthwise of the block. To illustrate a practical embodiment of the invention, let us assume that the width of the groove is .01 inch. In Fig. 2 a mask 15 has been applied transversely to the groove and having a width on the same order as the width of the groove. This mask 15 may be simply a metal strip laid on the surface or it may be a lacquer painted on the surface and extending down onto the groove as shown. Such a lacquer should be easily strippable from the surface or easily dissolved in a suitable solvent.

In Fig. 3 a metal coating 16, 17, and 18 has been evaporated onto the masked glass block, for example, by the usual vacuum coating technique. Thus, the surfaces 16, 17 and 18 are metal coated. The sides of the groove may also have received some metal coating, but this does not interfere with the operation of the invention in any way.

Figures 4, 5, 6:
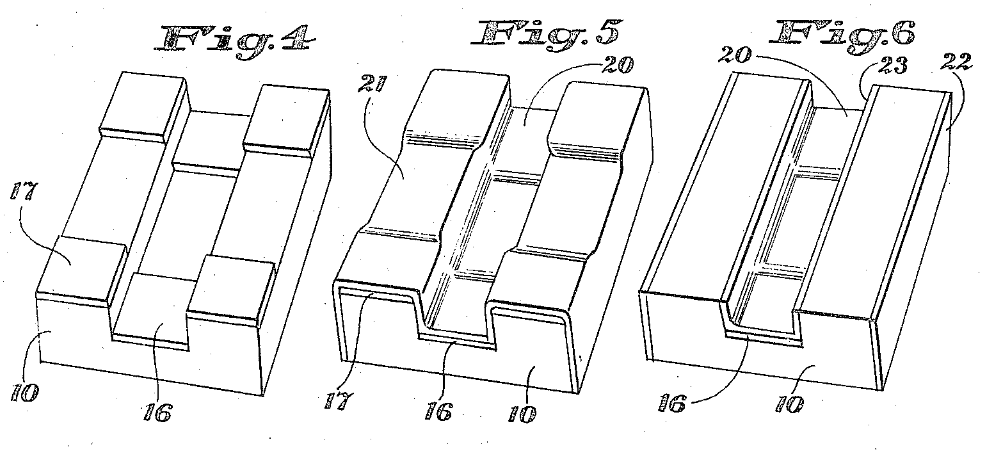

In Fig. 4 the mask 15 has been removed carrying with it the metal 18 coated thereon, but leaving the metal electrodes 16 and 17 on the glass block 10.

In Fig. 5 a photoconductive material has been applied by chemical precipitation or by evaporation. Method of applying selenium, lead sulfide or lead selenide or various other materials by either of these techniques are known. The photoconductive material 20 in the groove covers both the electrode 16 and the area between the electrodes which had been shielded by the mask 15. The photoconductive material is also applied to the tops of the glass surface as shown at 21. The step shown in Fig. 6 may be performed immediately following that shown in Fig. 5 or may be postponed until after the step shown in Fig. 7 or until after the step shown in Fig. 8.

In Fig. 6 the metal 17 and the photoconductive material 21 have been removed from the glass surface by fine grinding or lapping, but the photoconductive material and electrodes down in the groove 20 have been left. There is also photoconductive material 22 on the outside of the block and on the sides 23 of the groove, but this excess material in general does not interfere with the invention, except that it has to be removed from the outer ends of the electrode 16 to permit lead wires or contact clamps to be attached thereto. Accordingly, in Fig. 7 a resist material 25 is applied over the part of the photosensitive material which is to be retained, i. e. over the part which on the inner edges of the electrode 16 and the part between the electrodes. This resist material 25 is usually in the form of a stripe rather than just a spot and extends transversely across the whole block including any additional grooves parallel to the one here under consideration. It is shown as a spot for clarity. A suitable solvent for the photoconductive material is then applied, exposing the electrode 16 and removing all of the photoconductive material 20 except the part which is protected by the resist 25. Thus, only the edges of the photoconductive material 20 show in Fig. 8.

Figures 7, 8, 9:
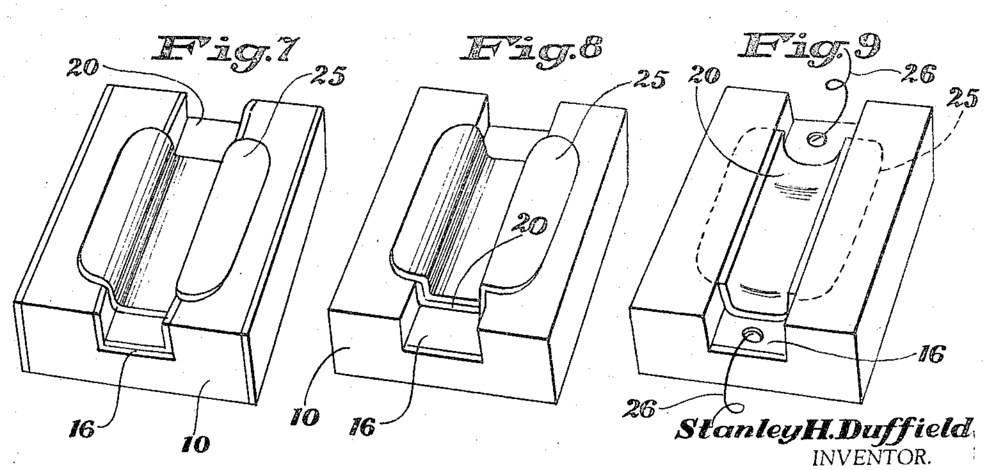

As shown in Fig. 9 suitable leads 26 may be attached to the electrodes 16 and the resist may be removed or it may remain as shown by the broken lines. Preferably this resist is allowed to remain as a protective layer for the photoconductive layer 20. In this case, the resist must be transparent to the radiation which is to be measured by the photoconductive cell.

Figures 10, 11, 12:
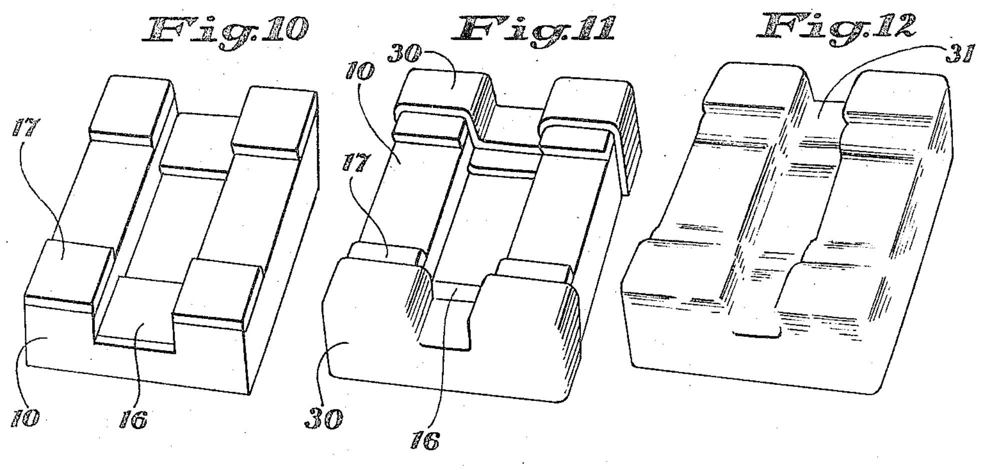
Fig. 10 is identical to Fig. 4 and Figs. 10–15 constitute illustrations of the later stages of an alternative embodiment of the invention.
Figures 13, 14, 15:
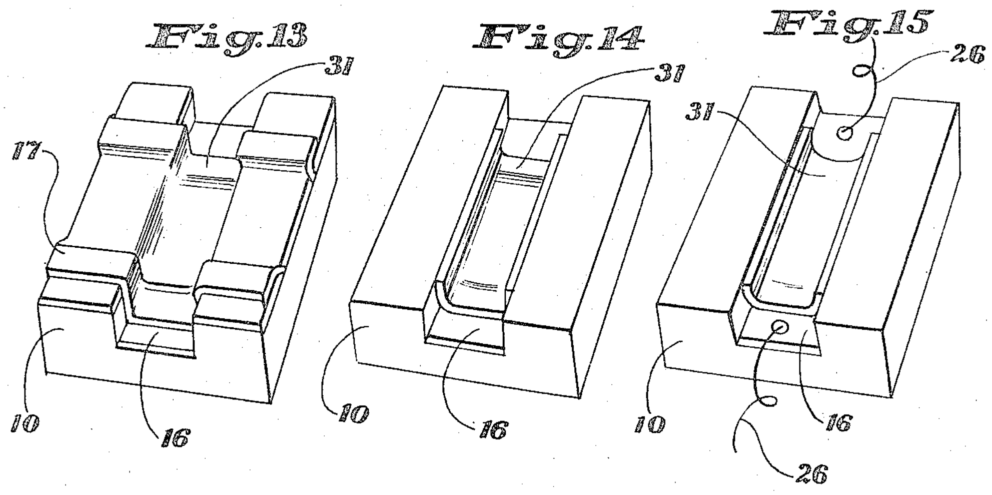

An alternative procedure for the last 5 steps of the process is illustrated in Figs. 10–15. It should be noted that Fig. 10 is identical to Fig. 4. In Fig. 11, however, masking material 30 has been applied in transverse strips covering only the outer ends of the electrodes 16 and 17 and leaving the inner edges of these electrodes and the previously shielded areas of the glass block 10 exposed. The photoconductive layer 31 is then applied over all the block as illustrated in Fig. 12. Removal of the masking material 30 by suitable solvent as illustrated in Fig. 13 leaves the photoconductive material 31 only on the inner edges of the electrodes and the area therebetween. Lapping the surface of the glass then leaves the electrodes 16 and the photoconductive material 31 only down in the groove as illustrated in Fig. 14.

Fig. 15 is similar to Fig. 9 illustrating the resultant cell. Again it does not matter whether the grinding operation is performed immediately after the step shown in Fig. 12 or, as shown, after the step shown in Fig. 13.

Figure 16:
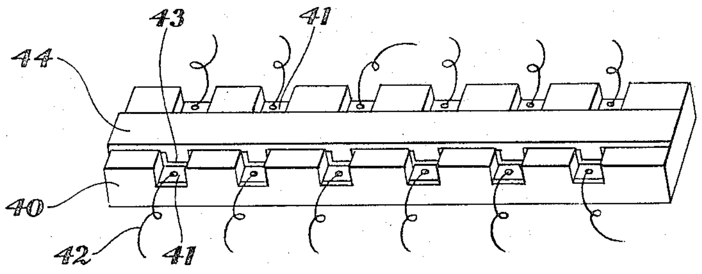
Fig. 16 illustrates a row of cells manufactured according to the method shown in Figs. 1–9.

Fig. 16 is identical to Fig. 9 with the resist material 44 (corresponding to material 25 in Fig. 9) left in place, except that there is a plurality of parallel grooves forming a row of such cells. In Fig. 16 the glass block 40 has 6 grooves in each of which there is a pair of electrodes 41 with suitable leads 42 and a photoconductive layer 43 extending between the electrodes. A resist 44 extends transversely across all of the cells and extends down to the grooves. In practice it looks substantially flat across the tops of the grooves and, therefore, is so illustrated in Fig. 16. This resist is transparent to infrared in the case of lead sulfide cells used for measuring infrared radiation. For example, the resist may consist of selenium or arsenic trisulfide or any of the common waxes or plastics such as polystyrene, or the methacrylates or polyvinyl alcohol.

Figure 17:
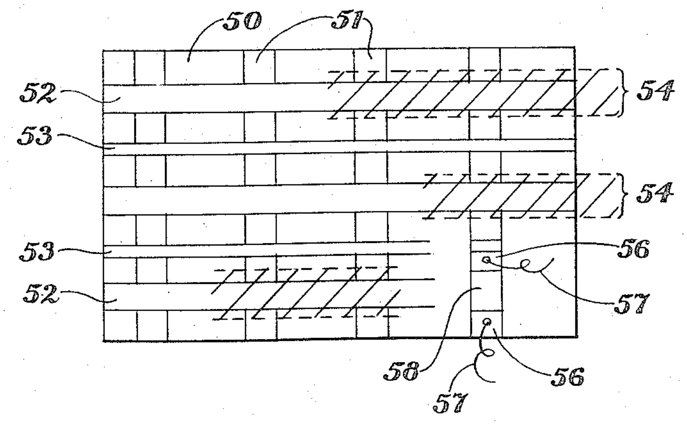
Fig. 17 illustrates an array of cells similarly manufactured.

In Fig. 17 a large sheet of glass 50 is provided with parallel grooves 51. For the first stage of the preparation of the cells according to the method illustrated in Figs. 1–9, masks 52 and 53 are placed or coated transversely across the groove, the strips 52 having a width equal to the length of the ultimate cells and the strips 53 are merely to divide one row of cells from the next. Electrodes are then evaporated and the masks 52 and 53 removed. The whole glass surface is then coated, by evaporation or by chemical deposition, with a photoconductive layer. Resist strips represented by the shaded area 54 and corresponding to the material 25 of Fig. 7 are applied across the areas which are ultimately to constitute the cells. These strips 54 are slightly wider than the strip 52 had been. There are no such strips over the area formerly covered by the separator mask 53. The photoconductive material is then dissolved away except under the strips 54. Then or at any time following the deposition step, the glass surface is lapped removing all of the surface material except that which is down in the grooves.

This leaves electrodes 56 engaging the ends of photoconductive area 58 down in the groove and covered by the resist. Leads 57 are applied to the electrodes 56. The method of attaching these leads is not part of the present invention.

Figure 18:
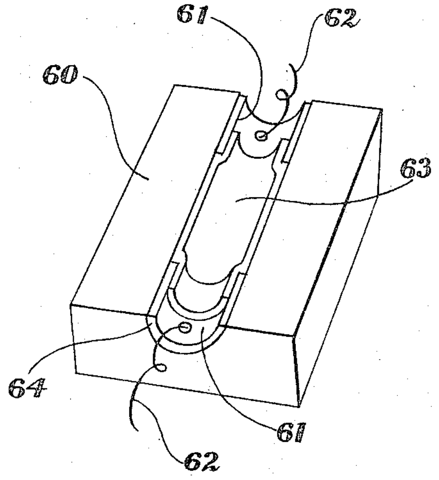
Fig. 18 is an enlarged perspective view of a cell made according to the invention, in which the groove in the glass is cylindrical in section.

The purpose of Fig. 18 is merely to illustrate that the cross section of the groove is not critical. In Fig. 18 the groove is cylindrical in shape instead of rectangular. It could be any shape. The block 60 has a cylindrical groove 64 in which electrodes 61 have been deposited by the above-described method. Leads 62 are attached thereto and a photoconductive layer 63 extends between the electrodes and overlaps each of them slightly. The sensitivity of the cell depends on the size thereof but this can be determined for any particular type of groove which one is using and the groove may be made of any selected width to give the sensitivity desired.

It will be noted that each of the operations involved in this method of manufacture can be performed easily with high precision. Glass may be grooved with the groove width held to close tolerances. The transverse masks are stripes and their width can also be held to close tolerances. The lapping step cuts the electrodes down to size and makes the cell width equal to the groove width. Any variations in the "effective" width of the photoconductive material, due to the shape of the groove and the method of depositing the material introduce only a constant factor which means that the cells are uniformly reproducible. The resist stripe is not of critical width, although it can be controlled precisely. Furthermore, it acts as a protective coating, which, combined with the fact that all of the cell is down in the groove protected from mechanical abrasion, means the resultant cell is extremely rugged.

I claim:

1. The method of manufacturing a small photoconductive cell which comprises depositing metal electrodes onto a flat glass surface having a groove therein past a mask transverse to the groove, the effective width of the mask being the desired length of the cell, removing the mask, depositing a photoconductive layer onto the glass and groove surface which had been shielded by said mask and onto the edges of both electrodes in the groove and removing the metal and photoconductive layer from the glass surface other than the parts down in said groove.

2. The method according to claim 1 including the additional steps of overcoating the photoconductive layer with a resist in the area which had been shielded and extending onto said edges of both electrodes and removing the photoconductive layer from all areas not protected by said resist.

3. The method according to claim 2 in which the resist is transparent to radiation to which the photoconductive layer is sensitive and is left in place on the finished cell.

4. The method according to claim 1 including the additional steps after depositing the electrodes and before depositing the photoconductive layer, of applying a masking layer transverse to the groove on the outer ends of the electrodes but not covering the inner edges of the electrodes or the areas of glass and groove shielded by the first mask and, after depositing the photoconductive layer, of removing said masking layer.

5. The method according to claim 1 in which said removing of metal and photoconductive layer is done by lapping the surface on a flat lap with a fine lapping compound.

6. The method of manufacturing a small photoconductive cell of width A and length B which comprises making a groove of width A in a flat glass surface, placing a mask of width B transversely across the groove, vacuum evaporating a metal past the mask onto the glass surface and into the groove, removing the mask, depositing a photoconductive layer onto the glass and groove surface which had been shielded and onto the edges of both electrodes in the groove, applying a resist overcoating to said areas of the layer, removing all of the layer not covered by said resist and sometime subsequent to said deposition of the photoconductive layer, lapping the surface on a flat lap removing the metal and photoconductive layer from the glass surface other than the parts down in said groove.

7. A photoconductive cell comprising a glass plate with a flat surface, a narrow groove in the surface, metal electrodes coated onto the ends of the groove, a photoconductive material coated onto the electrodes and into the groove between the electrodes, a protective coating on the material which coating is transparent to radiation to which the material is sensitive, all material from the flat surface except in the grooves having been ground away.

No references cited.